United States Patent
Haartsen

(10) Patent No.: US 7,453,853 B2
(45) Date of Patent: Nov. 18, 2008

(54) ADAPTIVE CORRELATION OF ACCESS CODES IN A PACKET-BASED COMMUNICATION SYSTEM

(75) Inventor: Jacobus C. Haartsen, Hardenberg (NL)

(73) Assignee: Ericsson Technology Licensing AB, Lund (SE)

(*) Notice: Subject to any disclaimer, the term of this patent is extended or adjusted under 35 U.S.C. 154(b) by 612 days.

(21) Appl. No.: 10/780,620

(22) Filed: Feb. 19, 2004

(65) Prior Publication Data

US 2005/0078614 A1    Apr. 14, 2005

Related U.S. Application Data

(60) Provisional application No. 60/509,530, filed on Oct. 9, 2003.

(51) Int. Cl.
*H04B 7/216* (2006.01)
*H04B 7/00* (2006.01)
*H04L 5/04* (2006.01)
*G06F 11/00* (2006.01)

(52) U.S. Cl. .............. 370/335; 370/204; 370/252; 370/342; 455/41.2

(58) Field of Classification Search ............. 455/41.2; 370/204, 252, 335, 342
See application file for complete search history.

(56) References Cited

U.S. PATENT DOCUMENTS

| | | | |
|---|---|---|---|
| 5,748,098 A | 5/1998 | Grace | |
| 5,815,507 A | 9/1998 | Arora et al. | |
| 6,012,160 A | 1/2000 | Dent | |
| 6,108,366 A | 8/2000 | Haartsen | |
| 6,112,093 A | 8/2000 | Nordlund | |
| 6,345,066 B1 | 2/2002 | Haartsen | |
| 6,590,928 B1 | 7/2003 | Haartsen | |
| 6,829,288 B2* | 12/2004 | Orava | 375/132 |
| 6,940,431 B2 | 9/2005 | Haartsen | |
| 2002/0048330 A1 | 4/2002 | Kafemann et al. | |
| 2002/0110105 A1* | 8/2002 | Awater et al. | 370/338 |

(Continued)

FOREIGN PATENT DOCUMENTS

EP    1335350 A2    8/2003

(Continued)

OTHER PUBLICATIONS

PCT International Search Report, dated Aug. 18, 2005, in connection with International Application No. PCT/EP2005/001508.

(Continued)

*Primary Examiner*—Barry W Taylor
(74) *Attorney, Agent, or Firm*—Potomac Patent Group PLLC

(57) ABSTRACT

Whether to indicate reception of an access code in a receiver operating in a communications system is determined by receiving a signal and generating a correlation value by correlating the received signal with a reference code. A threshold level is set to a first value if the receiver is in a scan mode. The threshold level is set to a second value if the receiver is in a traffic mode, wherein the second value corresponds to a lower degree of correlation than the first value. The correlation value is compared with the threshold level. Reception of the access code is indicated only if the correlation value compares favorably with the threshold level.

47 Claims, 9 Drawing Sheets

U.S. PATENT DOCUMENTS

| | | | |
|---|---|---|---|
| 2002/0141568 | A1 | 10/2002 | Fong et al. |
| 2003/0026356 | A1* | 2/2003 | Brommer .................... 375/324 |
| 2005/0152317 | A1* | 7/2005 | Awater et al. ............... 370/338 |

FOREIGN PATENT DOCUMENTS

| | | |
|---|---|---|
| WO | WO 01/26260 A1 | 4/2001 |
| WO | WO 03/077064 A2 | 9/2003 |

OTHER PUBLICATIONS

PCT Written Opinion, dated Aug. 18, 2005, in connection with International Application No. PCT/EP2005/001508.

J.C. Haartsen, "The Bluetooth Radio System", IEEE Personal Communications Magazine, Feb. 2000, pp. 28-36, vol. 7, No. 1.

European Search Report dated Nov. 2, 2004 in connection with U.S. Appl. No. 10/780,620.

Hedberg, T., et al., "Evolving WCDMA." Ericsson Review, 2001, No. 3, pp. 124-130, December.

Zhang, Z., et al., "Advanced baseband technology in third-generation radio base stations." Ericsson Review, 2003, No. 1, pp. 32-41, December.

Müller, F., et al., "Further evolution of the GSM/EDGE radio access network." Ericsson Review, 2001, No. 3, p. 116, December.

Ekudden, E., et al., "On demand mobile media—A rich service experience for mobile users." Ericsson Review, 2001, No. 4, pp. 168-177, December.

"3$^{rd}$ Generation Partnership Project; Technical Specification Radio Access Network; Physical channels and mapping of transport channels onto physical channels (FDD) (Release 5)." 3$^{rd}$ Generation Partnership Project, Technical Specification 25.211, V5.5.0, Sep. 2003, pp. 1-51.

3$^{rd}$ Generation Partnership Project; Technical Specification Radio Access Network; User Equipment (UE) radio transmission and reception (FDD) (Release 6), 3$^{rd}$ Generation Partnership Project, Technical Specification 25.101, V6.2.0, Sep. 2003, pp. 1-100.

3$^{rd}$ Generation Partnership Project; Technical Specification Radio Access Network; Multiplexing and channel coding (FDD) (Release 5), 3$^{rd}$ Generation Partnership Project, Technical Specification 25.212, V5.6.0, Sep. 2003, pp. 1-75.

* cited by examiner

ADAPTIVE CORRELATION OF ACCESS CODES IN A PACKET-BASED COMMUNICATION SYSTEM

CROSS REFERENCE TO RELATED APPLICATIONS

This application is related to U.S. Provisional Application No. 60/509,530, filed Oct. 9, 2003 in the name of Johan Nilsson and entitled "Adaptive Threshold for HS-SCCH Part 1 Decoding"; and to U.S. patent application Ser. No. 10/780,633 filed on even date herewith in the name of Johan Nilsson and entitled "Adaptive Threshold for HS-SCCH Part 1 Decoding."

BACKGROUND

The present invention relates to packet-based communications and more particularly to correlation of access codes in packet-based communication systems.

In recent decades, progress in radio and VLSI technology has fostered widespread use of radio communications in consumer applications. Portable devices, such as mobile radios, can now be produced having acceptable cost, size and power consumption.

Although wireless technology is today focused mainly on voice communications (e.g., with respect to handheld radios), this field will likely expand in the near future to provide greater information flow to and from other types of nomadic devices and fixed devices. More specifically, it is likely that further advances in technology will provide very inexpensive radio equipment, which can be easily integrated into many devices. This will reduce the number of cables currently used to interconnect devices. For instance, radio communication can eliminate or reduce the number of cables used to connect master devices with their respective peripherals. The aforementioned radio communications will require an unlicensed band with sufficient capacity to allow for high data rate transmissions. A suitable band is the ISM (Industrial, Scientific and Medical) band at 2.45 GHz, which is globally available. The band provides 83.5 MHz of radio spectrum.

To allow different radio networks to share the same radio medium without coordination, signal spreading is usually applied. In fact, the FCC in the United States currently requires radio equipment operating in the 2.4 GHz band to apply some form of spreading when the transmit power exceeds about 0 dBm. Spreading can either be at the symbol level by applying direct-sequence (DS) spread spectrum techniques, or at the channel level by applying frequency hopping (FH) spread spectrum techniques. The latter is attractive for the radio applications mentioned above since it more readily allows the use of cost-effective radios. A system called Bluetooth™ has been developed to provide pervasive connectivity, especially between portable devices like mobile phones, laptops, PDAs, and other nomadic devices. This system applies frequency hopping to enable the construction of low-power, low-cost radios with a small footprint. The system supports both data and voice. The latter is optimized by applying fast frequency hopping (with a nominal rate of 800 hops/s through the entire 2.4 GHz ISM) in combination with a robust voice coding. The air interface uses time slots with a nominal length of 625 microseconds, which corresponds to the dwell time of the FH. During a time slot, a single packet can be sent. Devices based on the Bluetooth™ system concept can create so called piconets, which comprise a master device, and one or more slave devices connected via the FH piconet channel. During traffic mode, the FH sequence used for the piconet channel is completely determined by the address or identity of the device acting as the master. The system clock of the master device determines the phase in the hopping sequence. In the Bluetooth™ system, each device has a free-running system clock. Each of the slave devices adds a time offset to its clock such that it becomes aligned with the clock of the master device. By using the master address to select the proper hopping sequence and using the time offset to align to the master clock, the slave devices keep in hop synchrony to the master device; that is, master and slave devices remain in contact by hopping synchronously to the same hop frequency or hop carrier. For more details, the reader is referred to, "The Bluetooth radio system," by J. C. Haartsen, published in *IEEE Personal Communications Magazine*, Vol. 7, No. 1, February 2000, pp. 28-36.

The hop sequences used in the Bluetooth™ system are generated through a hop selection mechanism as is described in U.S. Pat. No. 6,108,366, issued to J. C. Haartsen on Aug. 22, 2000, and entitled "Method and apparatus for the generation of frequency hopping sequences." With this method, hop carriers are generated "on the fly". The mechanism has no inherent memory: address and clock information instantaneously determine the sequence and phase and therefore directly the desired hop carrier. The advantages of such a selection scheme are numerous. By changing address and clock, a device can jump from one FH piconet channel controlled by one address/clock combination to another piconet controlled by another address/clock combination. More information about this aspect of the Bluetooth™ system may be found in U.S. Pat. No. 6,590,928, issued to J. C. Haartsen on Jul. 8, 2003 and entitled "FH piconets in an uncoordinated wireless multi-user system." In addition, this selection mechanism provides a large number of possible FH sequences. The sequence selection is based on 28 bits in the master identity. As a result, $2^{28}$ or 268, 435, 456 different hop sequences are defined. The length of each sequence is determined by the master clock which counts from 0 to $2^{27}-1$ at a rate of 1600 increments per second and wraps around after about 23.3 hours. The number of possible sequences and the size of each sequence make it impossible to store the Bluetooth™ FH sequences and process them off-line. Instead, a selection mechanism is used as described in U.S. Pat. No. 6,108,366 (referenced above).

For a proper operation of the Bluetooth™ hopping channel, the master and the slave have to remain in FH synchrony. The frequency hopping is driven by the native clock of the master of the piconet. At each packet reception, the slave adjusts its clock offset such that the input of the hop selection mechanism is aligned with the input in the master. The slaves use a special synchronization word, called the access code, which precedes the Bluetooth™ packets for timing resynchronization. The access code defined in Bluetooth™ consists of a 4-bit preamble of alternating logical ones and zeroes, followed by a 64-bit sync word. In case a packet header is to follow, the access code is trailed by a 4-bit postamble, also consisting of alternating logical ones and zeroes. The sync word is based on a (64, 30) expurgated block code with a bit-wise Exclusive OR'ed ("EXORed") overlay of a 64-bit full-length PN sequence. The minimum Hamming distance between different code words is 14. The access code is derived from the 24 least significant bits (LSBs) of the Bluetooth™-Device address (BD_ADDR). Each Bluetooth™ unit has a unique 48-bit BD_ADDR for an unambiguous addressing scheme. In a piconet, each radio packet exchanged between the master and the slaves is preceded by this access code derived from the BD_ADDR of the master. Only packets with the proper access code are accepted by the recipient. The access code is further used for bit and frame synchronization and to adjust the slave clock offset (with respect to the master clock) in order to remain FH synchronized to the master. In the receiver, the received symbol sequence representing the access code is compared with the desired access code (i.e., the reference code). When sufficient symbols (e.g., bits) match, successful reception of the access code is indicated and the synchronization parameters are updated. (As used herein, words such as "indicate" and "declare" are intended to denote any logical mechanism that is asserted when the requirements for deeming that the access code has been successfully received have been satisfied. Such mechanisms include, but are not limited to any one or a combination of the following: generating a particular signal, setting a particular flag, and taking a particular branch in program logic.)

Due to disturbances on the propagation channel, it is expected that some symbols in the received access code might be in error. To accommodate such an operating environment, the system is designed to declare successful reception of an access code even if a number of symbols are erroneous. A threshold k is defined, indicating how many symbols may be in error without preventing a successful access code reception from being indicated. If N is the total number of symbols, then $k \leq N$. If the number of matching symbols is less than k, the access code is rejected. If the desired access code was present, but was rejected because of too many errors, this is called a False Rejection. The false rejection (FR) rate depends not only on the symbol error rate but also on the threshold k: the higher k, the less errors are tolerated and the higher the FR rate. By lowering k, the FR rate is reduced. However, k cannot be chosen too low, as in that case random bit sequences (noise) or other access codes may trigger the receiver; that is, the receiver may think that the correct access code has arrived, when in fact only noise or an incorrect access code have been received. This situation is called a False Alarm. The false alarm rate increases as k is lowered. Clearly there is an optimal threshold k which couples a low FR rate to an acceptable FA rate.

Up to this point, the description has focused on the use of the access code in connection with maintaining synchrony between the master and the slave after a connection has been established (referred to herein as "traffic mode"). However, in Bluetooth™ systems, the access code is also used during the connection establishment or acquisition mode. This mode, more generally referred to herein as "scan mode," is described in U.S. Pat. No. 6,345,066, issued to J. C. Haartsen on Feb. 5, 2002 and entitled "Reduction of access time delay in FH radio systems using a DS mode." The access code is considered as a direct-sequence spread spectrum code and used for signaling during initial setup when the FH channel needs to be established. Details on the initial FH synchronization procedures can be found in U.S. Pat. No. 5,940,431, issued to J. C. Haartsen on Aug. 17, 1999 and entitled "Access technique of channel hopping communications system." In idle state, a Bluetooth™ unit wakes up regularly in a scan mode to listen on a particular frequency carrier either to the access code corresponding to its own BD_ADDR (page scan mode) or to an access code associated with an inquiry mechanism (inquiry scan mode). (That is, the access code in this instance is derived from the receiving unit.) There are 32 different frequencies the idle unit can listen to, but per wake-up instant it listens only to a single frequency. In the next wake-up instant it listens to the next frequency, and so on. The unit that wants to make contact, the paging unit, does not know when the idle unit will wake up and on which frequency. It therefore repeatedly sends the access code sequentially on different frequencies. When the paging unit hops at a 3200 hops/s rate, it takes 10 ms to hop through all the 32 frequencies. If the idle unit listens for at least 10 ms on one of these frequencies, it will certainly receive the access code because one of the paging unit's transmissions will coincide with the frequency the idle unit is listening on. The actual connection setup scheme is a little more complicated (e.g. the 32 frequencies are split into two trains of 16 carriers each by the paging unit) and the interested reader is further referred to the article "The Bluetooth radio system," by J. C. Haartsen mentioned above, or to the Bluetooth™ specifications.

When the idle unit receives the access code, it confirms the reception by returning a signal to the paging unit, which signal again consists of this access code. Accordingly, in between transmissions, the paging unit also listens for the access code. Once the two access codes are exchanged as a handshaking, the two units are in FH synchronization. In the next packet sent by the paging unit, more synchronization information is included in order to move to a hopping sequence that uses all 79 carriers available in the 2.4 GHz band. It can be seen that in the connection setup, the access code plays a dominant role. In this case too, the received signal is compared with a reference code and only if there is sufficient agreement between the received signal and the reference will the receiver indicate the successful reception of the access code. Again, a threshold k is defined indicating the minimum number of symbols that must match before a successful reception is indicated. As in the ongoing-connection mode (referred to more generally herein as "traffic mode"), the threshold will determine the False Alarm and False Rejection rates.

However, the requirements on FA and FR during the scan mode are completely different from the FA and FR during the traffic mode. In traffic mode, the FR is crucial as it directly has an impact on the overall packet error rate. Therefore, a low threshold k is desirable. In the scan mode, FA is crucial as it affects the power consumption in the idle state. To avoid starting the system on a wrong access code, or even on noise, a high threshold k is desirable. Clearly, there are contradictory requirements in the receiver regarding the match of the received signal with respect to the reference code.

While the problems set forth above have been presented in the context of a Bluetooth™ system, they are by no means restricted to such an environment. To the contrary, such problems would arise in any telecommunications system that relies on a level of correlation between a received access code and an expected access code to make decisions not only with respect to scan mode but also with respect to traffic mode.

It is therefore desirable to have a way of providing good FA and FR characteristics in the traffic mode to obtain acceptable packet error rate, while simultaneously providing good FA and FR characteristics in the scan mode to obtain acceptable power consumption.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses and machine readable storage media that determine whether to indicate reception of an access code in a receiver operating in a communications system by receiving a signal and generating a correlation value by correlating the received signal with a reference code. A threshold level is set to a first value if the receiver is in a scan mode. The threshold level is set to a second value if the receiver is in a traffic mode, wherein the second value corresponds to a lower degree of correlation than the first value. For example, in embodiments having 64-bit long reference codes and in which higher values correspond to higher degrees of correlation, the first value may be set to 52 and the second value may be set to 48. The correlation value is compared with the threshold level. Reception of the access code is indicated only if the correlation value compares favorably with the threshold level.

In some embodiments in which correlating the received signal with the reference code includes performing multiplication, the second value is lower than the first value. By contrast, in other embodiments in which correlating the received signal with the reference code includes performing one or more Exclusive OR operations, the second value is higher than the first value.

In some embodiments, the correlation value compares favorably with the threshold level if the correlation value is greater than or equal to the threshold level. In alternative embodiments, such as those in which generating a correlation value includes performing one or more Exclusive OR operations, the correlation value compares favorably with the threshold level if the correlation value is less than or equal to the threshold level.

In some embodiments, the access code identifies a channel used for communicating the signal.

In some embodiments, the access code is at least in part derived from a unique address associated with the transmitting unit. This is the case, for example, in Bluetooth™ systems during traffic mode. Alternatively, the access code may identify the receiver. This is the case, for example, in Bluetooth™ systems during scan mode.

In some embodiments, the second value may be dynamically determined as a function of a quality-of-service parameter. The quality-of-service parameter may be, for example, a current packet error rate. In some of these embodiments, the second value is dynamically determined to be a value that yields a false rejection rate that is substantially 10 times lower than the current packet error rate. In some embodiments, the second value is dynamically determined by a function that maintains an inverse relationship between the second value and the current packet error rate. In alternative embodiments, the second value is dynamically determined by a function that maintains a proportional relationship between the second value and the current packet error rate.

In alternative embodiments, the quality-of-service parameter is a signal to noise ratio. In still other alternative embodiments, the quality-of-service parameter is a carrier to interference ratio.

In yet other alternatives, the second value is established by setting the second value equal to an initial value, and then repeatedly decreasing the second value until a quality-of-service parameter does not change anymore. Alternatively, the second value may be established by setting the second value equal to an initial value, and then repeatedly adjusting the second value until a quality-of-service parameter changes. In such embodiments involving dynamic determination of the second value, the quality-of-service parameter may, for example, be a current packet error rate, a signal to noise ratio, or a carrier to interference ratio.

In another aspect, the first value enables the receiver to exhibit an acceptable false alarm rate during scan mode, and the second value enables a receiver to exhibit an acceptable false rejection rate during traffic mode.

In still another aspect, a false alarm is prevented from corrupting reception of a message during traffic mode by checking a remaining part of the received signal to detect the presence of errors. Reception of the received signal is aborted if errors are detected.

BRIEF DESCRIPTION OF THE DRAWINGS

The objects and advantages of the invention will be understood by reading the following detailed description in conjunction with the drawings in which.

DETAILED DESCRIPTION

Figure 1:
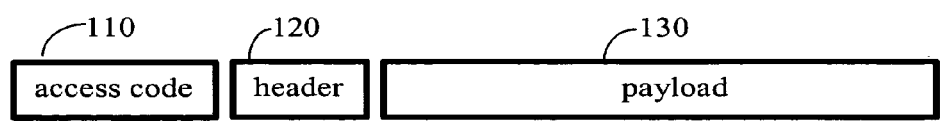
FIG. 1 is an illustration of the packet format applied in a Bluetooth™ system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

The invention will now be described in greater detail in connection with a number of exemplary embodiments. To facilitate an understanding of the various aspects of the invention, the exemplary embodiments rely on principles that are common in Bluetooth™ systems. However, as explained in the BACKGROUND section of this specification, the various problems addressed by the invention are not exclusive to Bluetooth™ systems. To the contrary, such problems will be found in any telecommunications system that relies on a level of correlation between a received access code and an expected access code to make decisions not only with respect to scan mode but also with respect to traffic mode. It will be readily apparent to those skilled in the art that the various solutions described herein in the context of Bluetooth™ systems are readily transferable to any comparable system.

In one aspect of the invention, a system is proposed having a variable correlation threshold. The threshold level is adjusted based on the unit's mode of operation. During the page and inquiry scan modes (e.g., the Bluetooth™ connection acquisition mode), the threshold is set to a relatively high level in order to keep the false alarm rate low. A unit in idle state should not be awakened in vain too often because this increases the average current consumption. The operating time of portable units is very much a function of the power consumption in the idle state, so this should be designed to be as small as possible. Alternatively, in the traffic mode, the threshold is adjusted to be a relatively lower level. In the traffic mode, the false rejection rate is crucial because it impacts the throughput rate. For a high throughput rate, the false rejection rate should be as small as possible. These and other concepts will now be described in even greater detail in the discussion which now follows.

In Bluetooth™ systems, each packet exchanged on the frequency-hopping piconet channel is preceded by an access code. The Bluetooth™ packet format 100 is shown in FIG. 1. A 72-bit access code 110 is followed by a 54-bit header 120, which is followed by a payload 130 which can be of variable length. The access code 110 is unique for each piconet and serves two purposes: identification and synchronization. First, it uniquely identifies the packets carried by the piconet. If two piconets overlap in the same area, they may sometimes select the same carrier despite the fact that they will use different FH sequences. At that moment, a receiver synchronized to one piconet may receive a packet belonging to another piconet. In this respect, it will be noted that having both channels simultaneously select the same carrier may not necessarily result in a collision or disturbance. If the jamming transmission is much stronger in power than the intended transmission, the jamming system may reach the receiver undisturbed. Alternatively, since Bluetooth™ systems support packet-switched connections, at that moment in time there may not even be an intended transmission by the receiver's own piconet.

To prevent "stealing" from another piconet, the receiver first checks whether the packet is preceded by the proper (i.e., expected) access code 110. A sync word in the access code 110 is derived from the Bluetooth™ address (BD_ADDR) of the master of the piconet. Different masters will have different addresses so their resulting access codes 110 are necessarily different.

In addition to identification, the access code 110 is also used for synchronization. A sync word in the access code has good auto-correlation properties and is therefore helpful for obtaining bit timing and frame timing. In other words, it helps the receiver to find the best sampling point and the first bit of the packet header.

Figure 2A:
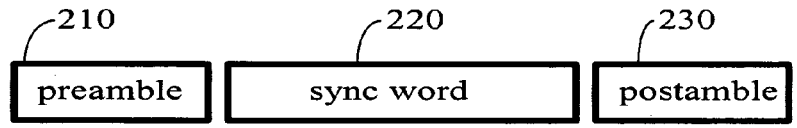
FIG. 2A is a detailed illustration of an access code.
Figure 2B:
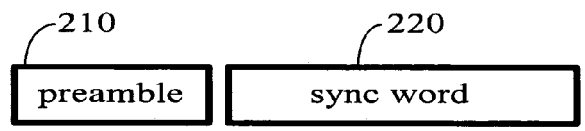
FIG. 2B is a detailed illustration of the ID code.

FIG. 2A illustrates the structure of a typical access code 110. The access code 110 has three fields. It begins with a 4-bit preamble 210 of alternating ones and zeroes. This is followed by a 64-bit sync word 220 which is derived from the BD_ADDR, as previously discussed. Finally, there is a 4-bit postamble 230, also consisting of alternating ones and zeroes. The alternating ones and zeroes in the preamble help the receiver perform coarse frequency synchronization, whereas the alternating ones and zeroes in the postamble help the receiver perform fine frequency and timing synchronization. During the connection mode, when packets are exchanged, the entire 72-bit access code is used. However, during initial connection setup (which is a scan mode), only the first fields, namely the preamble and the sync word, are used. This is called an ID (identification) packet 250, and is illustrated in FIG. 2B. This ID packet 250 is 68-bits in length and carries neither a header nor a payload, which explains why no postamble is required. The ID packet 250 is used for initial handshaking during the scan mode.

Figure 3A:
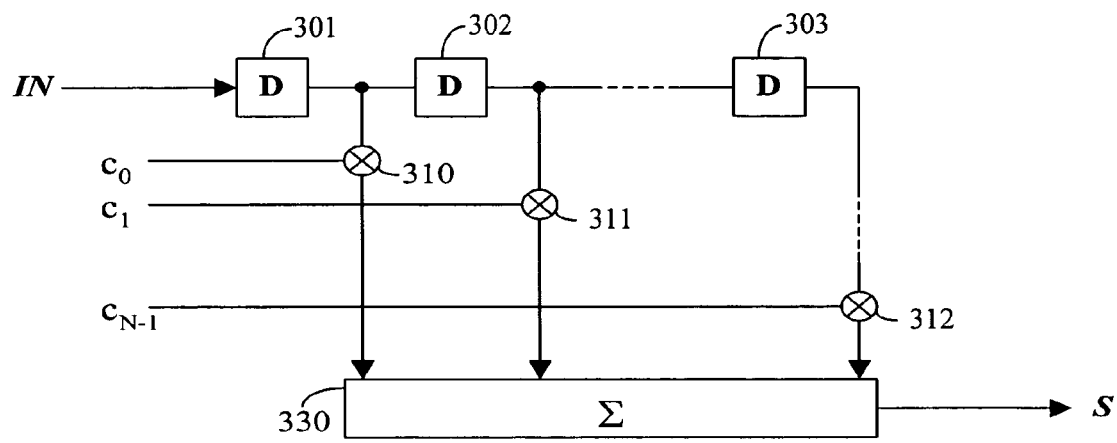
FIG. 3A is an exemplary embodiment of a correlator implementation using a tapped delay line.

Both in the traffic mode and the scan mode, the received signal is compared with a reference code. One way of doing this is with a sliding correlator. An exemplary implementation of a sliding correlator is shown in FIG. 3A. It comprises a tapped delay line, with delay elements 301, 302, . . . 303 each imposing a delay of one symbol time (in Bluetooth™ systems, the symbol time is 1 microsecond). Assuming that antipodal or polar signaling is used (i.e., so that the each bit represents, for example, either +1 or −1), the outputs of the delay elements are multiplied by the symbols of the reference signal. The outputs of the multipliers 310, 311, . . . 312 are summed in an accumulator 330. The more symbols match (i.e., the received symbol and reference symbol are identical), the higher the output S of the accumulator 330. In fact, the output S of the accumulator 330 in this embodiment is directly proportional to the degree of correlation between the incoming signal and the reference signal. When there is no correlation, the correlator output S will be rather low. When there is full correlation, the correlator output S will be N (where N is the number of delay elements in the correlator 300, as well as the number of symbols in the reference signal). Generally, the output S of the accumulator 300 is compared with a threshold k. If S<k, it is decided that no access code has been received. If S≧k, it is decided that the access code indeed is present. Usually, an oversampling approach is used. Before an optimal sampling point is selected, the symbols are oversampled, for example four times. This yields four phases in the input signal. The correlation value for each phase is determined. The phase with the highest degree of correlation is used as the sampling phase (at a rate of one sample per symbol). The more complex oversampled correlator is not shown but would be readily derivable to those skilled in the art.

Figure 3B:
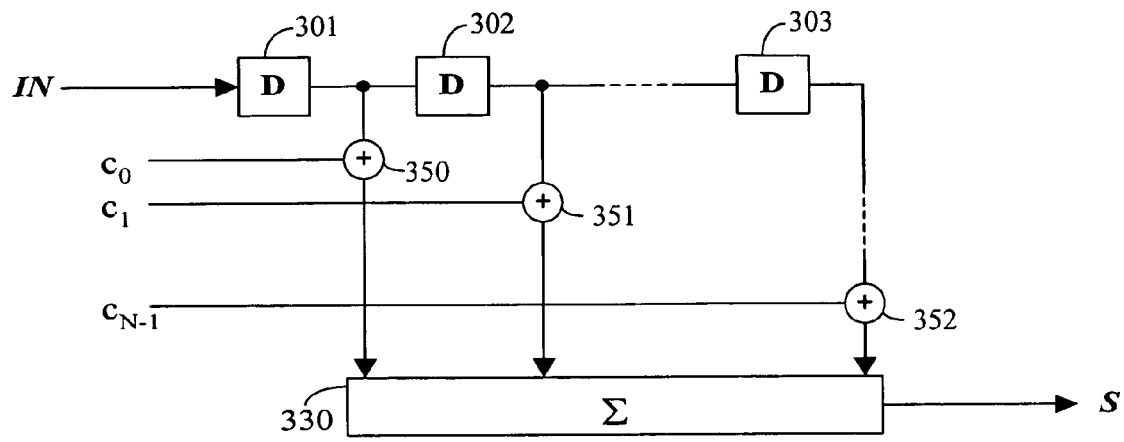
FIG. 3B is an alternative exemplary embodiment of a correlator implementation using a tapped delay line.

In alternative embodiments of a correlator 300', in which each bit represents either 0 or 1, multipliers are not used; instead, the outputs of the delay elements may be Exclusive OR'ed—"EXORed"—with the symbols of the reference signal, as illustrated in FIG. 3B. As can be seen in the figure, EXOR elements 350, 351, . . . 352 take the place of the multiplier elements 310, 311, . . . 312. In those alternative embodiments employing EXOR operations, the more symbols match the lower (rather than higher) the output S of the accumulator 330, since two bits that are EXOR'ed yield a "0" when they are identical, and a "1" otherwise. As a result, there is an inverse relation between the output S and the degree of correlation so that a value of S=0 would indicate an exact match between the reference signal and the incoming signal. That is, lower values of S indicate higher degrees of correlation, and vice versa. Those skilled in the art will readily ascertain from this description the principles necessary to adapt the invention to such embodiments. In order to facilitate further discussion of the invention, it is assumed that multipliers are being used, so that higher values of S and of k correspond to higher degrees of correlation, and lower values of S and k correspond to lower degrees of correlation.

For a correlation of length N, the FR rate for a threshold k is $$FR(k, p) = P(S < k) = \sum_{i=0}^{k-1} \binom{N}{i} p^{N-i}(1-p)^i \quad (1)$$

where p is the raw bit error rate and the notation $$\binom{N}{i}$$

denotes $$\frac{N!}{i!(N-i)!}.$$

In traffic mode, the propagation and interference conditions affect the final BER. As an example, consider a good quality channel in which N=64 and p=0.001. (A value of N=64 corresponds, for example to a Bluetooth™ system in which the sync word 220 is 64 symbols long—the preamble 210 and postamble 230 are not considered in the correlation process.) A graph of the resultant FR rate 401 in traffic mode as a function of k is shown in FIG. 4.

In scan mode, it is usually the case that no signal is transmitted, so that the receiver receives pure noise. For the scan mode false alarm (FA) rate in pure noise (binary symmetric channel) we assume a raw bit error rate (BER) of 0.5. If the noise signal has k or more bits in common to the reference code, a correlation is indicated and we have a false alarm. For a correlation of length N, the $FA_n$ rate for a threshold k is:

$$FA_n(k) = P(S \geq k) = \sum_{i=k}^{N} \binom{N}{i} 0.5^N \quad (2)$$

Figure 4:
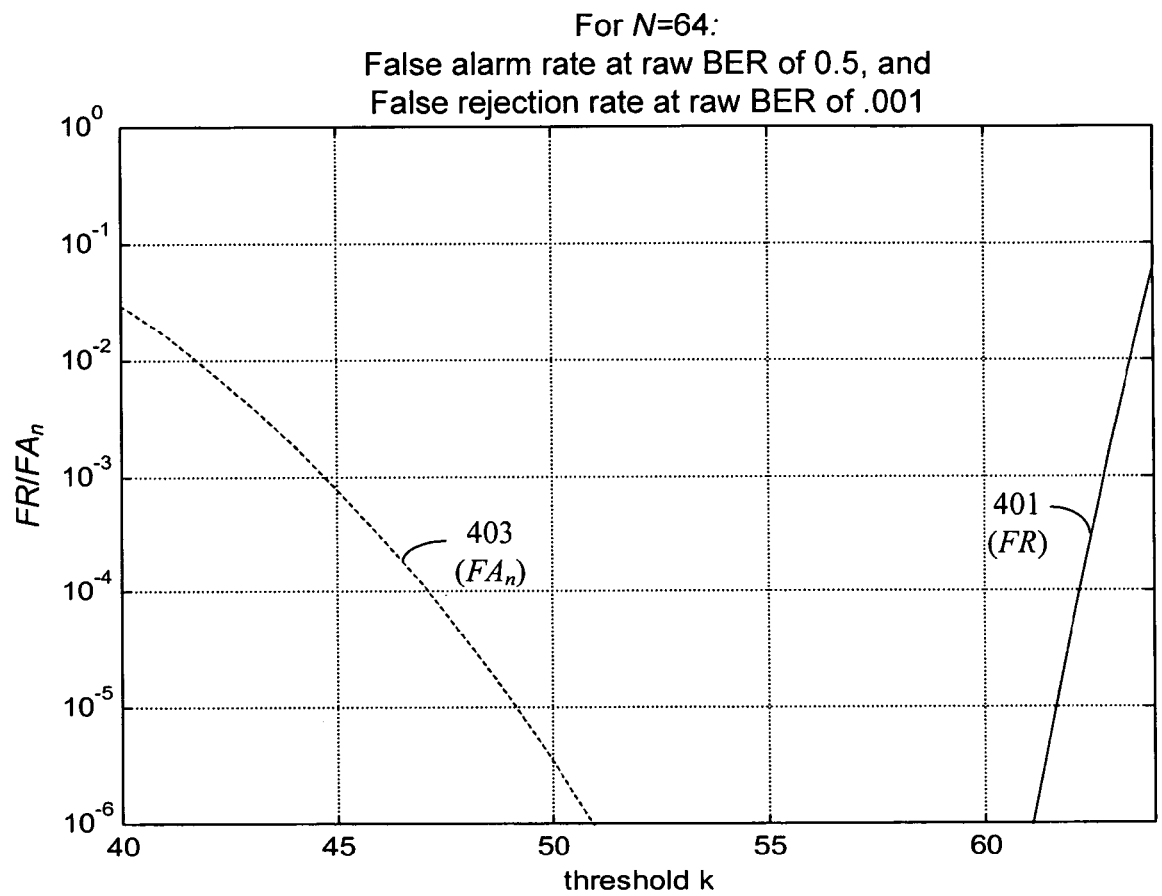
FIG. 4 is a graph comparing false alarm rates at a raw bit error rate of 0.5 and false rejection rates at a raw bit error rate of 0.001, both as a function of correlation threshold in a system for which N=64.

FIG. 4 also shows the scan mode $FA_n$ rate 403 for noise (i.e., BER=0.5) as a function of k. Clearly, if the threshold is chosen to be around k=55, both a very low false alarm and low false rejection rate can be achieved.

Figure 5:
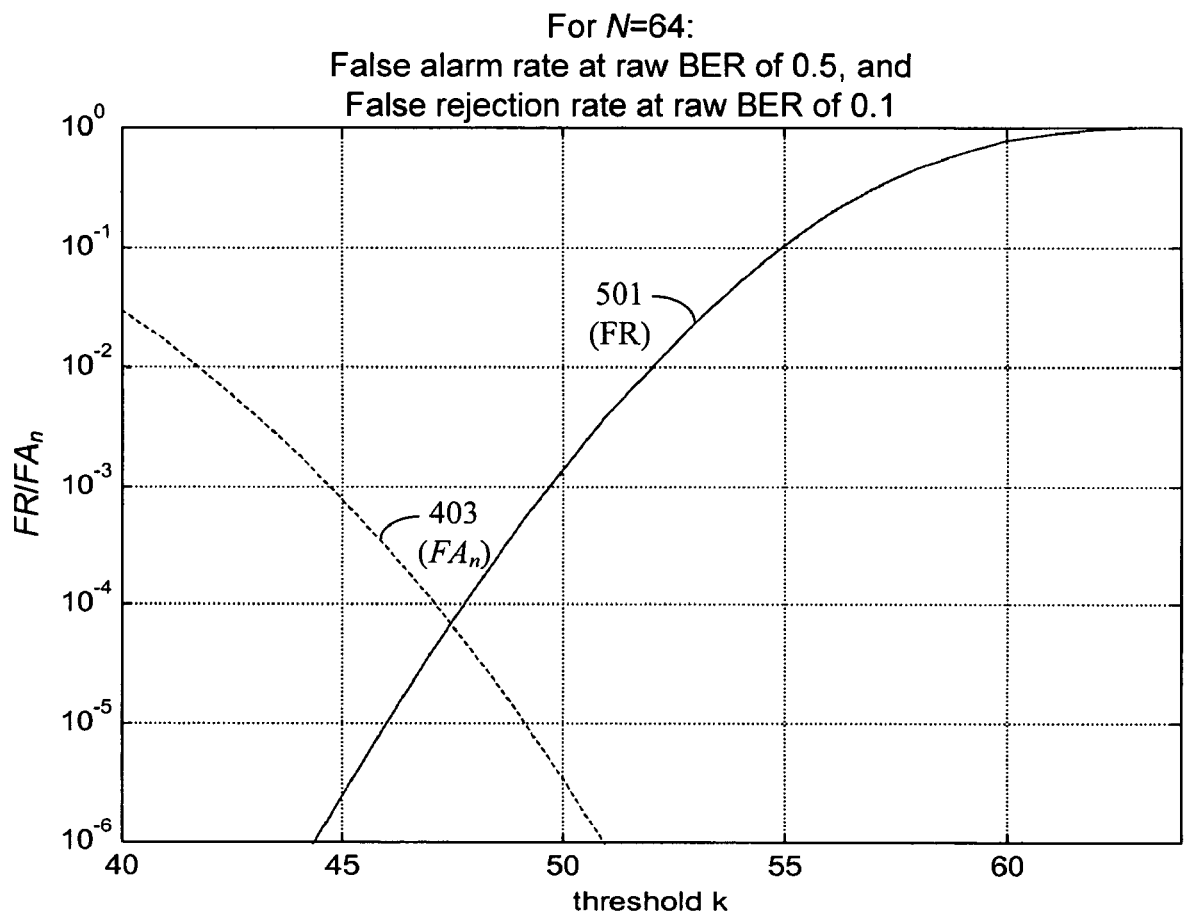
FIG. 5 is a graph comparing false alarm rates at a raw bit error rate of 0.5 and false rejection rates at a raw bit error rate of 0.1, both as a function of correlation threshold in a system for which N=64.

Now suppose it is desired to increase the range of a Bluetooth™ system, so that we again assume N=64. This can, for example, be achieved by using a more powerful forward error correction (FEC) coding on the packet header 120 and payload 130. If it is still desired to use the same access code, the bit error rates under which it has to operate are much higher. For example, when the traffic mode raw bit error rate is increased to 0.1, the FR rate 501 has worsened considerably as is shown in FIG. 5. Clearly, the best performance is now obtained when the threshold k is chosen to be 47 or 48 in order to get both a low FR and a low $FA_n$ rate.

FIGS. 4 and 5 together serve to illustrate the difficulty in selecting a threshold, k, that is good for both modes (i.e., scan mode and traffic mode) under all conditions.

So far, the discussion has focused only on the false alarm rate resulting from noisy conditions. However, a false alarm can also occur when an access code is received that is different from but is similar to the reference code. The FA rate on an unacceptable code depends on the Hamming distance between the unacceptable code and the reference, the raw bit error rate, and the correlation threshold. If the minimum Hamming distance is $d_{min}$, the threshold k must be bigger than $N-d_{min}$. Otherwise, a correlation would be indicated even if an unacceptable code were to arrive in an error-free environment. But a correlation can be indicated even when there are errors, because errors that occur in the segment of the unacceptable access code that differs from the reference code may cause the resultant distorted unacceptable code to become more similar to the reference code. Conversely, setting $k<N-d_{min}$ does not necessarily gives rise to a false alarm since errors may cause the distance between the unacceptable code and the reference code to increase—in fact, one would then have a rejection on an unacceptable code word. The false alarm $FA_c$ on an unacceptable code is given by:

$$FA_c(k, d, p) = P(S \geq k) \quad (3)$$

$$= \sum_{i=0}^{N-k} \left\{ \binom{N-d}{i} p^i (1-p)^{N-d-i} \sum_{j=k+d-N+i}^{d} \binom{d}{j} p^j (1-p)^{d-j} \right\}$$

Equation (3) is obtained in recognition that for a distance d, the unacceptable and reference codes have N−d symbols in common and differ on d instances.

Figure 6:
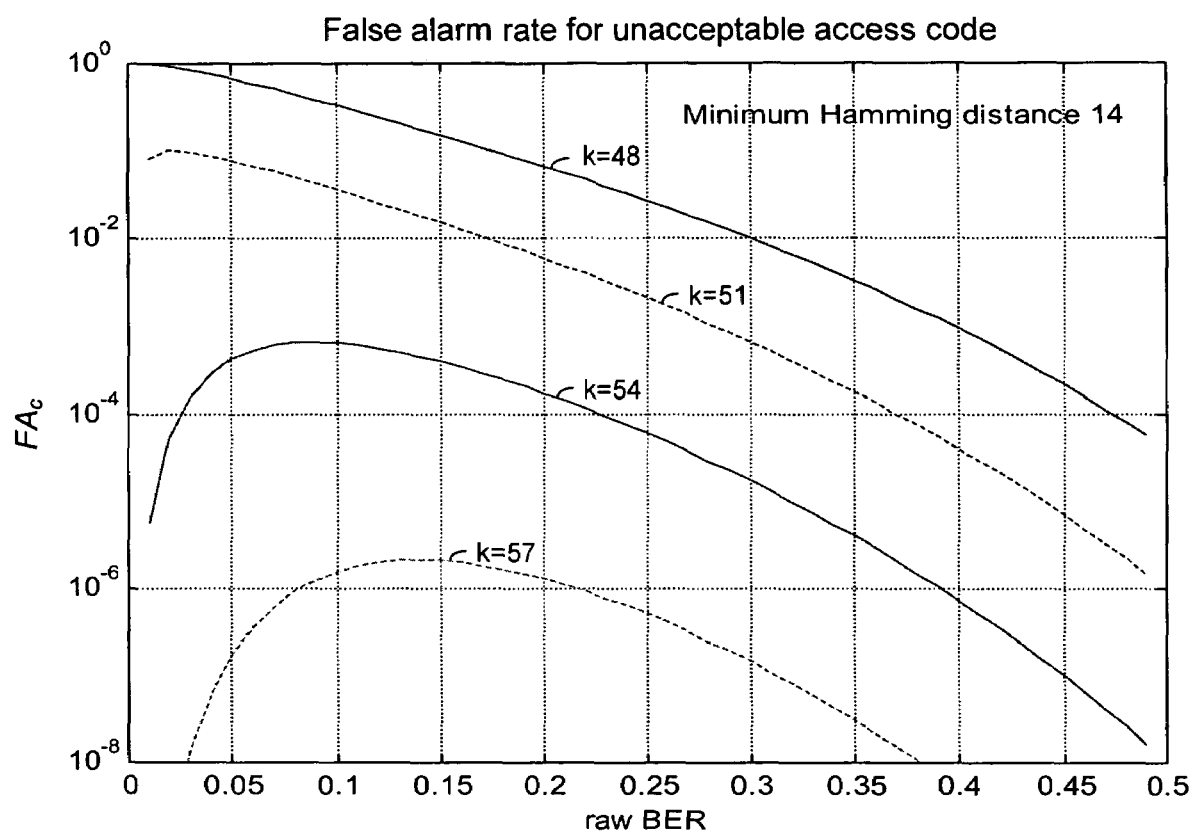
FIG. 6 is a graph showing false alarm rate as a function of the raw bit error rate with the correlation threshold a parameter, assuming a Hamming distance of 14.

The sync word 220 of the access code 110 in Bluetooth™ systems has a minimum distance of $d_{min}$=14. (Note that the minimum distance is only valid for a certain percentage of all unacceptable code words possible. Most unacceptable access code words have a larger distance than $d_{min}$ with respect to the reference). FIG. 6 is a series of graphs showing the false alarm rate caused by the unacceptable code for different threshold values and at different BER conditions. It can be seen that, as the BER approaches 0.5 one obtains the false alarm rate in pure noise conditions as given by Equation (2).

If one then considers both FIGS. 5 and 6, it becomes clear that the selection of the threshold is not trivial. The threshold k that gives good performance for the FR rate and the $FA_n$ rate in pure noise which is around 47-48, is not very attractive when considering the $FA_c$ rate for an unacceptable code because when there are no errors, the $FA_c$=1; that is, the unacceptable code will always be accepted as the desired code. Yet, a threshold of say k=54 yields an unacceptable FR rate in noisy environments (0.1 BER) as is shown in FIG. 5.

FR, $FA_n$ and $FA_c$ have a different impact on the performance of a wireless system in different scenarios. When a unit is in idle state (which includes use of a scan mode), it listens for the access code that indicates that another unit is seeking a connection. A high false alarm rate should be avoided under these circumstances because, for each trigger of correlation output, the receiving system enters a response mode trying to establish the connection. It will become apparent that the correlation trigger was false only after an authentication procedure or some other handshaking has taken place. This extra processing will have an impact on the scanning unit in idle (or standby) mode. Therefore $FA_n$ and $FA_c$ should be rather low in scan mode. By comparison during the scan mode, FR is of lesser importance and can therefore be permitted to be higher. This means that sometimes an ID packet will be missed during initial connection setup. Because retry and retransmission mechanisms are included in the setup procedure (the interested reader can learn more about this from the Bluetooth specifications, obtainable on the internet) a false rejection will result in a delay of the setup procedure, but not a catastrophic error; that is, the connection can still be established. So in idle state, FR rates on the order of several percents are acceptable.

When in traffic mode, packets are regularly exchanged on the air interface. In Bluetooth™ systems, a time slotted channel is used with time slots of length 625 microseconds. The beginning of a packet transmission is always aligned with a slot boundary. False Alarms will happen when no packet is transmitted (only noise—the rate of such False Alarms is denoted $FA_n$—see Equation 2), but since error checking mechanisms in the header and payload are implemented, further decoding will quickly reveal that a false alarm has occurred. Unlike the situation in scan mode, the system was already in operation (a packet was expected). Consequently, a $FA_n$ will have minimal impact on the current consumption of the receiving device. If $FA_c$ occurs, there is apparently another piconet in operation in close proximity. Receiving the wrong access code can lead to two situations. First, the unacceptable access code and the rest of the associated packet can be received without any errors. The packet likely will still be rejected, however, due to additional precautions in the receiver. There are three mechanisms:

Upper Address Part (UAP) involved in Header Error Check (HEC) and Cyclic Redundancy Check (CRC) generation Whitening Encryption The HEC and CRC give the possibility to detect bit errors in the header and payload, respectively. The HEC and CRC are generated with a Linear Feedback Shift Register (LFSR) where the header and payload bits act as input stream. However, before the HEC and CRC are generated, the contents of the LFSR are loaded (initialized) with the upper address part of the BD_ADDR. The 48-bit BD_ADDR has three parts: a 16-bit Non-significant Address Part (NAP), an 8-bit UAP, and a 24-bit Lower Address Part (LAP). The NAP has no meaning; the UAP is used in HEC and CRC calculations; and the LAP is used to generate the 64-bit sync word in the access code. The UAP in combination with the LAP constitute the 32-bit unique Bluetooth address. So even if the correlator has triggered because of a false alarm on an unacceptable code, it is highly probable that the HEC and CRC will not check (even in an error-free environment) since there was a different UAP used to generate the HEC and CRC.

Whitening is applied to avoid run-time lengths (long streams of logical ones or zeroes). The header and payload are scrambled (bit-wise EXORed) with a PN sequence that is derived from the FH clock to which the communicating units are synchronized. It is highly probable that the whitening sequence applied to the unacceptable header and payload will be different from the whitening sequence applied to acceptable headers and payloads because the FH clocks of the intended and unintended master units are unlikely to be aligned. Since whitening is applied after the HEC/CRC generation, de-whitening with the wrong sequence will most certainly result in a HEC and/or CRC failure.

Finally, in most cases in Bluetooth™ systems, encryption is applied in order to prevent eaves-dropping. The encryption sequence is derived from a secret key, the FH clock, and the Bluetooth™ addresses of both units. Encryption is applied by a bit-wise EXOR between the payload and the encryption sequence. Because the FH clocks of the intended and unintended master units are unlikely to be aligned, it is highly probable that for different communications, different encryption sequences will be used. After decryption, the CRC will most certainly not pass the check. So even if an unacceptable packet is received and it passes the access code test, it is highly probable that the packet will be rejected after further analysis.

In the second situation, the unacceptable access code might arrive, followed shortly thereafter by the desired access code. If the desired packet has a much lower power than the jammer, the jamming packet will survive (sufficient Carrier-to-Interference ratio to receive the unacceptable packet error-free) and the situation will be as described above. Alternatively, the desired packet can be of comparable power. In that case, a collision occurs and the received packet will not pass the HEC and CRC tests.

Summarizing, a $FA_c$ will result in packet processing, but it is highly probable that the packet will be rejected anyway. The impact on current consumption is minimal since during the traffic mode, all circuits are in operation (awake) anyway. Therefore, the FA in general plays a minor role in the traffic mode.

By contrast, the FR plays a dominant role in the traffic mode. If the access code is rejected, the entire packet is rejected (recall that, for a packet to be accepted, first the access code, then the HEC and then the CRC have to pass the test). In particular, when header and payload are made more robust in order to achieve a larger range, the access code should not be the bottleneck. The FR rate should be sufficiently below the failure rates due to HEC and CRC failure, say a factor of 10 difference. That means that if a packet error rate of a few percent is acceptable, the FR rate should be on the order of a few per mille.

In an aspect of the invention, the FA and FR behavior are independently optimized during the scan mode and during the traffic mode. In scan mode, the FA rate has a dominant impact on the standby current and should therefore be minimized. The FR rate should be kept in a reasonable range in order not to delay the connection setup too frequently. In the traffic mode, FA plays a minor role. Instead the FR rate should be well below the packet error rate (PER).

Figure 7:
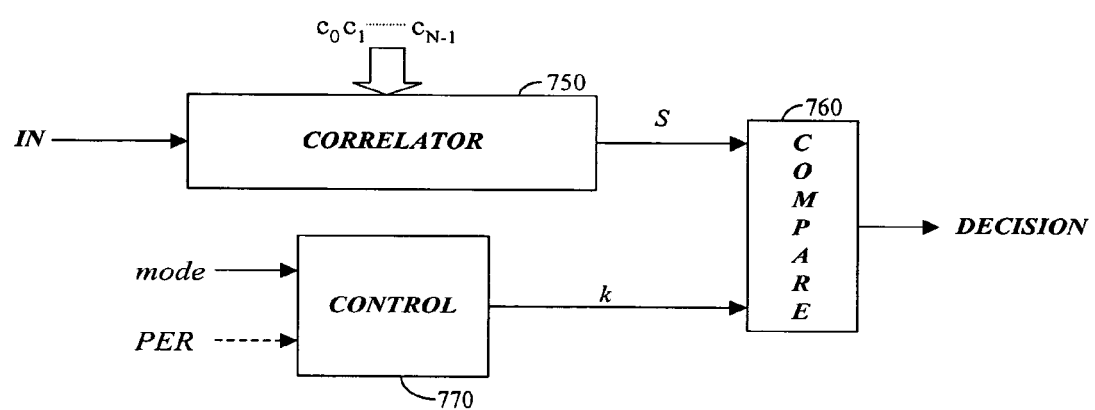
FIG. 7 is an exemplary embodiment of a correlator implementation in accordance with the invention.

All this can be realized by an intelligent control of the correlation threshold. An exemplary correlator architecture according to the invention is shown in FIG. 7. The output of a correlator 750 is compared to the threshold k in a decision unit 760. This threshold k is provided by a control unit 770. The control unit 770 generates the threshold k based on several conditions. First, a threshold k corresponding to a higher degree of correlation is selected during the scan mode (e.g., when scanning for the initial setup access code or the inquiry access code). When in traffic mode, the control unit changes the threshold k to one corresponding to a lower degree of correlation; in embodiments employing correlators such as the correlator 300 illustrated in FIG. 3, for example, the threshold k is directly proportional to the degree of correlation. In some embodiments, this can be a fixed value which results in an FR rate well below the worst case acceptable Packet Error Rate (PER). In alternative embodiments, the PER is adjusted (e.g., a new time-averaged value is determined) and supplied to the control unit 770, which then adjusts the k such that the FR will be well below the PER. In yet other alternative embodiments, this could be implemented by a control loop where the threshold k is initialized to correspond to a higher degree of correlation and then adjusted to correspond to lower degrees of correlation (e.g., lowered) until the PER does not change anymore. In the latter case, a larger k must periodically be tested in order to check whether a larger threshold is possible again (i.e. when the PER has reduced).

In still other alternative embodiments, the threshold k could be initialized to correspond to a lower degree of correlation and then adjusted to correspond to higher degrees of correlation (e.g., increased) until the PER changes.

In these embodiments, if PER conditions change, the threshold will adapt accordingly. In embodiments utilizing dynamically determined threshold levels, the lowest FA rate possible for acceptable FR rate is always obtained. In FIG. 7, the PER is supplied to the control unit 770. The PER can, for example, be derived from the baseband processing circuitry in the receiver (not shown). In alternative embodiments, other Quality-of-Service parameters can be used instead of PER, such as SNR or C/I ratios.

Figure 8:
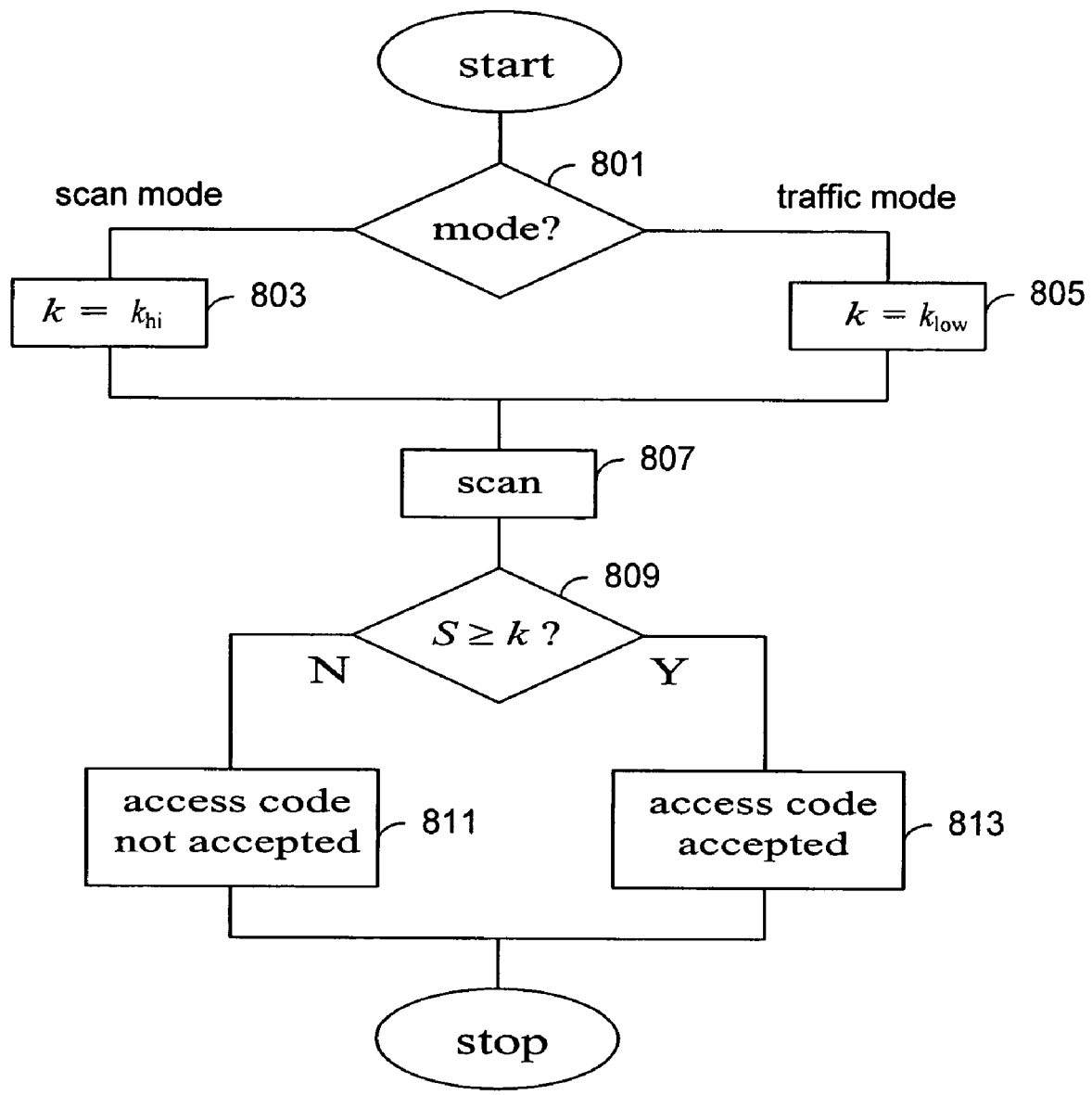
FIG. 8 is a flow diagram of threshold setting according to an exemplary embodiment of the invention.

FIG. 8 is a flow graph of an exemplary embodiment of the invention. First, it is determined in which mode the receiver is residing (decision block 801). This is done for the purpose of enabling a value of k to be selected that will yield the best performance for each mode. If it is determined that the unit is in a scan mode (e.g., page scan mode or inquiry scan mode) ("scan mode" branch out of decision block 801), then a relatively higher threshold level, $k_{hi}$, will be selected/generated (step 803). For example, in the exemplary embodiments a threshold of $k_{hi}$=52 may be used. This will result in a FR rate of 0.01 under raw BER conditions of 0.1. (When the raw BER is much lower, such as 0.001, the FR rate is practically zero). The $FA_n$ in pure noise is then well below $10^{-6}$. For the unacceptable access codes that are at the minimum distance from the reference code, the $FA_c$ rate is on the order of 0.01 provided that the raw BER is between 0.02 and 0.1; it is well below otherwise.

Returning to decision block 801, if it is determined that the unit is in traffic mode, ("traffic mode" branch out of decision block 801), then a relatively lower threshold level, $k_{low}$, will be selected/generated such that the access code will not affect the PER in worst case conditions (step 805). For example, if worst case conditions are at a 0.1 raw BER in the exemplary systems, a $k_{low}$=48 will result in a FR rate well below $10^{-4}$.

The selected/generated threshold level, k, is then used in the unit as earlier-described. That is, regardless of whether the unit is in scan mode or traffic mode, the unit scans the channel for access codes by comparing the received signal with the reference code (e.g., by means of a sliding correlator) (step 807). The correlation value, S, is then compared with the current threshold level, k (decision block 809). If the correlation value, S, is less than the current threshold level, k ("N" branch out of decision block 809), then the received signal is deemed not to include the reference access code (step 811).

However, if the correlation value, S, compares favorably with the current threshold level, k, (e.g., is greater than or equal to the current threshold level, k) ("Y" branch out of decision block 809), then the received signal is deemed to include the reference access code (step 813).

Figure 9:
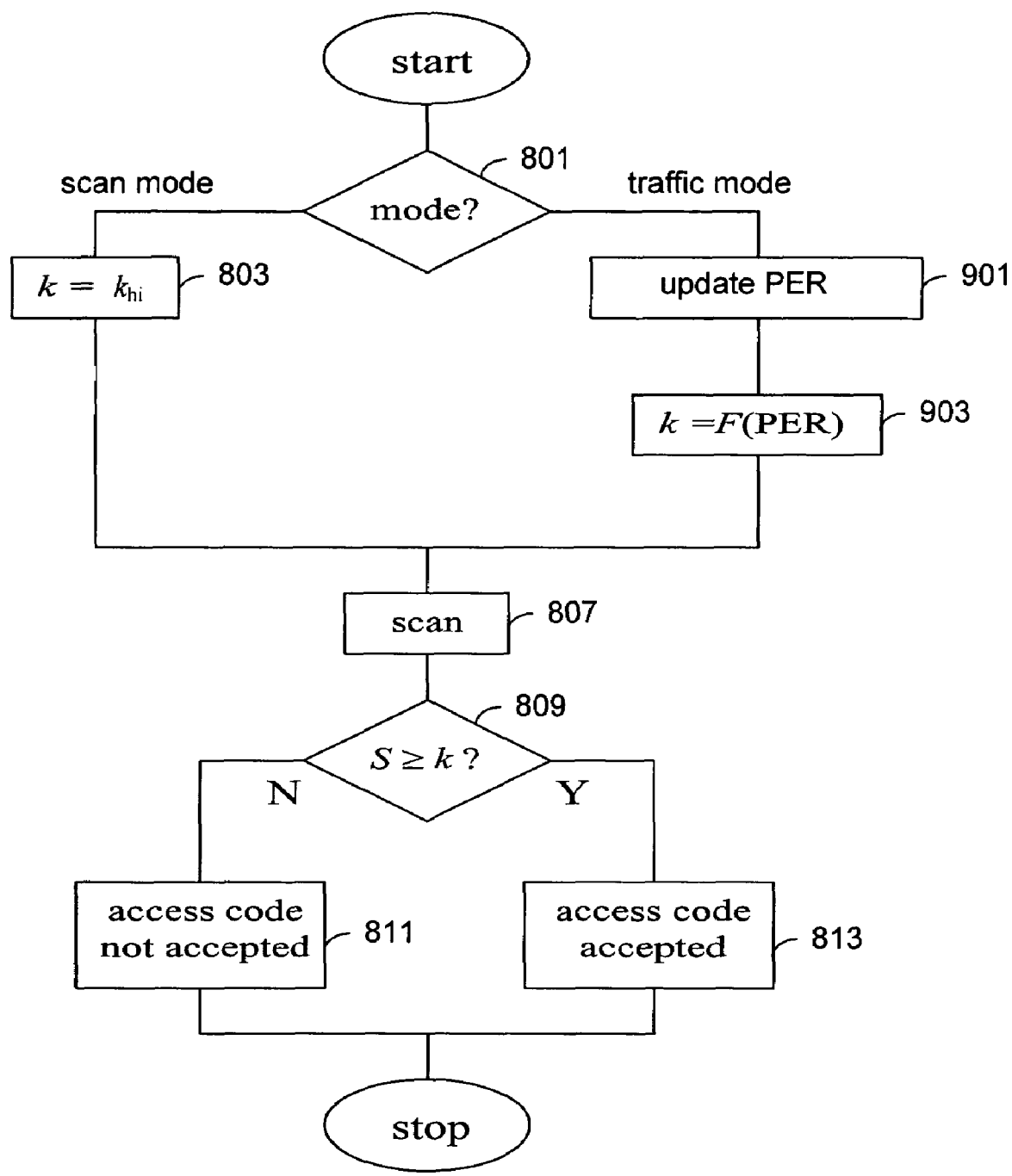
FIG. 9 is a flow diagram of threshold setting according to another exemplary embodiment of the invention.

FIG. 9 is a flow graph of an alternative embodiment of the invention. Steps/decision blocks 801, 803, 807, 809, 811, and 813 are the same as those illustrated in FIG. 8, and are therefore not described again. For the scan mode (e.g., page/inquiry scan mode), k is selected as in FIG. 8. However for this embodiment, in the traffic mode, the threshold k depends on (i.e., is a function of) the PER: k=F(PER). Accordingly, in this embodiment the unit first updates the PER (step 901), and then sets the threshold level, k, equal to F(PER) (step 903). Updating the PER may, for example, involve generating a new average value of PER.

The function F is designed to follow changes in the PER such that the best FA will always be obtained while keeping the FR at a reasonable level (e.g., at 10 times lower than the PER). In this way, the FR will not have a major impact on the PER. The function F can be determined heuristically and preferably gives an inverse relationship between the threshold k and the PER; that is, when PER rises, k decreases. It will be understood by those skilled in the art that other channel quality mechanisms can be used to control the correlation threshold k. Note that the PER depends not only on the raw BER, but also on the amount of coding applied in the header and the payload, and on the length of the header and the payload.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, specific values of threshold levels, such as $k_{lo}$=48 and $k_{hi}$=52, have been presented. It should be understood, however, that useable threshold values are a function of the length of the access code in any given embodiment. Thus, the illustrated values should be considered exemplary only; in other systems (having different access code lengths), the threshold levels would like be set to different values.

Also, the invention has been described with respect to threshold values, k, that are given in absolute terms. However, it will be recognized that in alternative embodiments, normalized values could be used. For example, in the context of a multiplier-based correlation system in which N=64, having values such as $k_{lo}$=48 and $k_{hi}$=52 means that the low threshold is satisfied when the degree of correlation is at least 48/64, and the higher threshold is satisfied when the degree of correlation is at least 52/64. The use of absolute versus normalized values is a design choice, left to the designer.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of determining whether to indicate reception of an access code in a receiver operating in a communications system, comprising:

receiving a signal;

generating a correlation value by correlating the received signal with a reference code;

setting a threshold level to a first value if the receiver is in a scan mode;

setting the threshold level to a second value if the receiver is in a traffic mode, wherein the second value corresponds to a lower degree of correlation than the first value;

comparing the correlation value with the threshold level; and indicating reception of the access code only if the correlation value compares favorably with the threshold level.

2. The method of claim 1, wherein:

correlating the received signal with the reference code includes performing multiplication; and the second value is lower than the first value.

3. The method of claim 1, wherein:

correlating the received signal with the reference code includes performing one or more Exclusive OR operations; and the second value is higher than the first value.

4. The method of claim 1, wherein the correlation value compares favorably with the threshold level if the correlation value is greater than or equal to the threshold level.

5. The method of claim 1, wherein:
generating a correlation value includes performing one or more Exclusive OR operations; and
the correlation value compares favorably with the threshold level if the correlation value is less than or equal to the threshold level.

6. The method of claim 1, wherein the access code identifies a channel used for communicating the signal.

7. The method of claim 6, wherein the access code is at least in part derived from a unique address associated with a transmitting unit.

8. The method of claim 6, wherein the access code is at least in part derived from a unique address associated with the receiver.

9. The method of claim 1, wherein:
the reference code is 64 symbols long;
the first value is 52; and
the second value is 48.

10. The method of claim 1, wherein the second value is dynamically determined as a function of a quality-of-service parameter.

11. The method of claim 10, wherein the quality-of-service parameter is a current packet error rate.

12. The method of claim 11, wherein the second value is dynamically determined to be a value that yields a false rejection rate that is substantially 10 times lower than the current packet error rate.

13. The method of claim 11, wherein the second value is dynamically determined by a function that maintains an inverse relationship between the second value and the current packet error rate.

14. The method of claim 11, wherein the second value is dynamically determined by a function that maintains a proportional relationship between the second value and the current packet error rate.

15. The method of claim 10, wherein the quality-of-service parameter is a signal to noise ratio.

16. The method of claim 10, wherein the quality-of-service parameter is a carrier to interference ratio.

17. The method of claim 1, wherein the second value is established by setting the second value equal to an initial value, and then repeatedly adjusting the second value until a quality-of-service parameter does not change anymore.

18. The method of claim 17, wherein the quality-of-service parameter is a current packet error rate.

19. The method of claim 17, wherein the quality-of-service parameter is a signal to noise ratio.

20. The method of claim 17, wherein the quality-of-service parameter is a carrier to interference ratio.

21. The method of claim 1, wherein the second value is established by setting the second value equal to an initial value, and then repeatedly adjusting the second value until a quality-of-service parameter changes.

22. The method of claim 1, wherein the first value enables the receiver to exhibit an acceptable false alarm rate during scan mode, and the second value enables a receiver to exhibit an acceptable false rejection rate during traffic mode.

23. The method of claim 22, further comprising:
during traffic mode, preventing a false alarm from corrupting reception of a message by checking a remaining part of the received signal to detect the presence of errors; and
during traffic mode, aborting reception of the received signal if errors are detected.

24. An apparatus for determining whether to indicate reception of an access code in a receiver operating in a communications system, comprising:
logic that receives a signal;
logic that generates a correlation value by correlating the received signal with a reference code;
logic that sets a threshold level to a first value if the receiver is in a scan mode;
logic that sets the threshold level to a second value if the receiver is in a traffic mode, wherein the second value corresponds to a lower degree of correlation than the first value;
logic that compares the correlation value with the threshold level; and
logic that indicates reception of the access code only if the correlation value compares favorably with the threshold level.

25. The apparatus of claim 24, wherein:
correlating the received signal with the reference code includes performing multiplication; and
the second value is lower than the first value.

26. The apparatus of claim 24, wherein:
correlating the received signal with the reference code includes performing one or more Exclusive OR operations; and
the second value is higher than the first value.

27. The apparatus of claim 24, wherein the correlation value compares favorably with the threshold level if the correlation value is greater than or equal to the threshold level.

28. The apparatus of claim 24, wherein:
the logic that generates a correlation value includes logic that performs one or more Exclusive OR operations; and
the correlation value compares favorably with the threshold level if the correlation value is less than or equal to the threshold level.

29. The apparatus of claim 24, wherein the access code identifies a channel used for communicating the signal.

30. The apparatus of claim 29, wherein the access code is at least in part derived from a unique address associated with a transmitting unit.

31. The apparatus of claim 29, wherein the access code is at least in part derived from a unique address associated with the receiver.

32. The apparatus of claim 24, wherein:
the reference code is 64 symbols long;
the first value is 52; and
the second value is 48.

33. The apparatus of claim 24, further comprising logic that dynamically determines the second value as a function of a quality-of-service parameter.

34. The apparatus of claim 33, wherein the quality-of-service parameter is a current packet error rate.

35. The apparatus of claim 34, wherein the second value is dynamically determined to be a value that yields a false rejection rate that is substantially 10 times lower than the current packet error rate.

36. The apparatus of claim 34, wherein the second value is dynamically determined by a function that maintains an inverse relationship between the second value and the current packet error rate.

37. The apparatus of claim 34, wherein the second value is dynamically determined by a function that maintains a proportional relationship between the second value and the current packet error rate.

38. The apparatus of claim 33, wherein the quality-of-service parameter is a signal to noise ratio.

39. The apparatus of claim 33, wherein the quality-of-service parameter is a carrier to interference ratio.

40. The apparatus of claim 24, wherein the second value is established by setting the second value equal to an initial value, and then repeatedly adjusting the second value until a quality-of-service parameter does not change anymore.

41. The apparatus of claim 40, wherein the quality-of-service parameter is a current packet error rate.

42. The apparatus of claim 40, wherein the quality-of-service parameter is a signal to noise ratio.

43. The apparatus of claim 40, wherein the quality-of-service parameter is a carrier to interference ratio.

44. The apparatus of claim 24, wherein the second value is established by setting the second value equal to an initial value, and then repeatedly adjusting the second value until a quality-of-service parameter changes.

45. The apparatus of claim 24, wherein the first value enables the receiver to exhibit an acceptable false alarm rate during scan mode, and the second value enables a receiver to exhibit an acceptable false rejection rate during traffic mode.

46. The apparatus of claim 45, further comprising:
   logic that prevents a false alarm from corrupting reception of a message during traffic mode by checking a remaining part of the received signal to detect the presence of errors; and
   logic that aborts reception of the received signal during traffic mode if errors are detected.

47. A computer readable carrier having stored thereon one or more instructions for causing a processor to determine whether to indicate reception of an access code in a receiver operating in a communications system, wherein the one or more instructions cause the processor to perform:
   receiving a signal;
   generating a correlation value by correlating the received signal with a reference code;
   setting a threshold level to a first value if the receiver is in a scan mode;
   setting the threshold level to a second value if the receiver is in a traffic mode, wherein the second value corresponds to a lower degree of correlation than the first value;
   comparing the correlation value with the threshold level; and indicating reception of the access code only if the correlation value compares favorably with the threshold level.

* * * * *

UNITED STATES PATENT AND TRADEMARK OFFICE
CERTIFICATE OF CORRECTION

PATENT NO. : 7,453,853 B2
APPLICATION NO. : 10/780620
DATED : November 18, 2008
INVENTOR(S) : Haartsen It is certified that error appears in the above-identified patent and that said Letters Patent is hereby corrected as shown below:

On the Title Page, item (56), under "U.S. PATENT DOCUMENTS", in Column 2, Line 3, delete "6,940,431 B2    9/2005" and insert -- 5,940,431 A    8/1999 --, therefor.

In Column 6, Line 55, after "magnetic disk," insert -- or --.

In Column 14, Line 16, delete "$k_{lo}$" and insert -- $k_{low}$ --, therefor.

In Column 14, Line 27, delete "$k_{lo}$" and insert -- $k_{low}$ --, therefor.

Signed and Sealed this

Twenty-sixth Day of May, 2009

JOHN DOLL
*Acting Director of the United States Patent and Trademark Office*